US012712319B2

(12) United States Patent
Sauvain et al.

(10) Patent No.: US 12,712,319 B2
(45) Date of Patent: Aug. 18, 2026

(54) DEVICE FOR PROVIDING ENHANCED COAXIAL CABLE CONNECTOR INSTALLATION AND/OR TIGHTENING

(71) Applicant: PPC BROADBAND, INC., East Syracuse, NY (US)

(72) Inventors: Henry Sauvain, East Syracuse, NY (US); Eric Purdy, Constantia, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 183 days.

(21) Appl. No.: 18/386,705

(22) Filed: Nov. 3, 2023

(65) Prior Publication Data

US 2024/0154363 A1 May 9, 2024

Related U.S. Application Data

(60) Provisional application No. 63/422,883, filed on Nov. 4, 2022.

(51) Int. Cl.
*H01R 13/641* (2006.01)
*H01R 13/622* (2006.01)
*H01R 13/629* (2006.01)

(52) U.S. Cl.
CPC ......... *H01R 13/641* (2013.01); *H01R 13/622* (2013.01); *H01R 13/629* (2013.01)

(58) Field of Classification Search
CPC ... H01R 13/641; H01R 13/622; H01R 13/629
See application file for complete search history.

(56) References Cited

U.S. PATENT DOCUMENTS 4,923,412 A * 5/1990 Morris ................. H01R 9/0521 439/578
5,586,910 A * 12/1996 Del Negro ........... H01R 9/0521 439/584
7,527,524 B1 * 5/2009 Coleman ............. H01R 9/0521 439/578

FOREIGN PATENT DOCUMENTS

EP 0901200 A2 3/1999
JP S4861376 U 8/1973

OTHER PUBLICATIONS

International Search Report and Written Opinion dated Feb. 9, 2024 in corresponding International Application No. PCT/US2023/036749, 20 pages.

* cited by examiner

*Primary Examiner* — Sean Gugger
(74) *Attorney, Agent, or Firm* — MH2 TECHNOLOGY LAW GROUP LLP; Stuart I. Smith

(57) ABSTRACT

A cable connector includes: a support portion that is structurally configured to move relative to a cable gripping portion when a first connector portion moves relative to a second connector portion; an indicator portion that is structurally configured to indicate an amount of radial compression of a cable gripping portion when the second connector portion moves in an axial direction; and the indicator portion is structurally configured to provide a visual stop indicator reference point when the second connector portion moves in the axial direction and when the first connector portion is coupled with the second connector portion such that the cable gripping portion grips the cable with a predetermined amount of radial force based on an outer diameter portion of the cable so as to allow an installer to use the visual stop indicator reference point to prevent under-tightening and/or over-tightening of the connector on the cable.

30 Claims, 6 Drawing Sheets

DEVICE FOR PROVIDING ENHANCED COAXIAL CABLE CONNECTOR INSTALLATION AND/OR TIGHTENING

CROSS-REFERENCE TO RELATED APPLICATION

This application claims the benefit of U.S. Provisional Application No. 63/422,883 filed Nov. 4, 2022, the disclosure of which is hereby incorporated by reference herein in its entirety.

BACKGROUND

The present invention relates generally to connectors for terminating coaxial cable. More particularly, the present invention relates to axially compressible connectors for hardline or semi-rigid coaxial cables.

Coaxial cables are commonly used in the cable television industry to carry cable TV signals to television sets in homes, businesses, and other locations. A hardline coaxial cable may be used to carry the signals in distribution systems exterior to these locations and a flexible coaxial cable is then often used to carry the signals within the interior of these locations. Hardline or semi-rigid coaxial cable is also used where a high degree of radio-frequency (RF) shielding is required.

The hardline cable includes a solid wire core or inner conductor, typically of copper or copper-clad aluminum, surrounded by a solid tubular outer conductor. The outer conductor is also usually made of copper or aluminum. Dielectric material or insulation separates the inner and outer conductors. The outer conductor is covered with a cable jacket or sheath of plastic to provide protection against corrosion and weathering.

Threaded cable connectors have been employed to provide even compression of the connector. Such connectors typically utilize some form of clamping mechanism that radially compresses the outer conductor of the cable against a tubular post or mandrel upon axial threaded movement of the connector components to retain the cable in the hardline connector. The clamping mechanism may include a conical sleeve surrounded by an outer sleeve which forces the conical sleeve to radially compress upon axial movement of the outer sleeve with respect to the conical sleeve. The length of the conical closure sleeve typically closes the full length of the mechanism with equal forces around the circumference of the mandrel. The resulting forces closing down on the coaxial cable compress the cable around the outside of the mandrel creating a formed bond on the outside surface.

The above referenced, and other, connectors can be used with cables having different outside diameters. However, cables having different outside diameters require the clamping mechanism to apply different amounts of compression to properly install the connector on the cable.

It may be desirable to provide a connector that overcomes one or more of the aforementioned disadvantages of hardline connectors. That is, it may be desirable to provide a connector having an improved system for use on cables of different outside diameters. For example, it may be desirable to provide the back nut of a hardline connector with markings that provide visual stop points corresponding to different amounts of compression to be applied to a cable being terminated by the connector such that a technician can apply a desired amount of compression based on the size of the cable.

SUMMARY

Embodiments provide a cable connector having an indicator portion that is structurally configured to provide a visual stop indicator reference point when a second connector portion moves in an axial direction and when a first connector portion is coupled with the second connector portion such that a cable gripping portion grips a cable with a predetermined amount of radial force based on an outer diameter portion of the cable so as to allow an installer to use the visual stop indicator reference point to prevent under-tightening and/or over-tightening of the connector on the cable.

Embodiments include a cable connector having: a first connector portion having a cable receiving end and a forward end opposite the cable receiving end; a second connector portion having a front end, and a back end that is structurally configured to be coupled with the forward end of the first connector portion; a third connector portion that is structurally configured to be coupled with the front end of the second connector portion; a support portion that is structurally configured to be positioned in the second connector portion; a cable gripping portion that is structurally configured to be positioned partially in the support portion; and a plurality of indicator portions. The cable gripping portion is structurally configured to include an angled portion; the support portion is structurally configured to include an angled portion that is structurally configured to contact the angled portion of the cable gripping portion; the angled portion of the support portion is structurally configured to move axially relative to the angled portion of the cable gripping portion when the first connector portion moves relative to the second connector portion; the first connector portion is structurally configured to include an engaging portion; the second connector portion is structurally configured to include an engaging portion; the engaging portion of the first portion is structurally configured to engage with the engaging portion of the second connector portion such that rotation of the first connector portion relative to the second connector portion moves the first connector portion axially relative to the second connector portion; the first connector portion includes a first surface that is structurally configured to contact the support portion; the first surface of the first portion is structurally configured to move the support portion axially into the second connector portion in response to the axial movement of the first connector portion relative to the second connector portion; the angled portion of the support portion is structurally configured to move relative to the angled portion of the cable gripping portion is response to axial movement of the support portion such that the cable gripping portion is moved radially inward; each of the plurality of indicator portions is structurally configured to correspond to a predetermined position of the first portion relative to the second connector portion; each of the predetermined positions of the first connector portion relative to the second connector portion corresponds to a preferred assembled position for a particular outer diameter of a cable on which the connector is to be installed; the indicator portions correspond to different amounts of radial compression of the cable gripping portion in response to axial movement of the support portion; and the indicator portions are structurally configured to provide visual stop indicator reference points when the second connector portion moves in an axial direction and when the first connector portion is coupled with the second connector portion such that the cable gripping portion grips the cable with a predetermined amount of radial force based on an outer diameter portion of the cable so as to allow an installer to use the visual stop indicator reference point to prevent under-tightening and/or over-tightening of the connector on the cable.

In particular embodiments, the first connector portion comprises a back nut assembly.

In particular embodiments, the second connector portion comprises a center body.

In particular embodiments, the third connector portion comprises a front nut assembly.

In particular embodiments, the support portion comprises a support sleeve.

In particular embodiments, the cable gripping portion comprises a cable gripping ferrule.

In particular embodiments, the angled portion of the cable gripping portion comprises a ramp.

In particular embodiments, the angled portion of the support portion comprises a ramp.

In particular embodiments, each of the indicator portions is structurally configured as a groove.

In particular embodiments, the first connector portion is structurally configured to include the plurality of indicator portions on an outer surface of the first connector portion.

In particular embodiments, the engaging portion of the first connector portion comprises a threaded portion.

In particular embodiments, the engaging portion of the second connector portion comprises a threaded portion.

Embodiments include a cable connector having: a first connector portion having a cable receiving end and a second end opposite the cable receiving end; a second connector portion having a first end, and a second end that is structurally configured to be coupled with the second end of the first connector portion; a support portion that is structurally configured to be positioned in the second connector portion; a cable gripping portion that is structurally configured to be positioned partially in the support portion; and an indicator portion. The support portion is structurally configured to move axially relative to the cable gripping portion when the first portion moves relative to the second connector portion; the first connector portion is structurally configured to engage with the second connector portion such that rotation of the first connector portion relative to the second connector portion moves the first portion axially relative to the second connector portion; the first connector portion is structurally configured to move the support portion axially relative to the second connector portion in response to the axial movement of the first portion relative to the second connector portion; the indicator portion corresponds to an amount of radial compression of the cable gripping portion in response to axial movement of the support portion; and the indicator portion is structurally configured to provide a visual stop indicator reference point when the second connector portion moves in an axial direction and when the first connector portion is coupled with the second connector portion such that the cable gripping portion grips the cable with a predetermined amount of radial force based on an outer diameter portion of the cable so as to allow an installer to use the visual stop indicator reference point to prevent under-tightening and/or over-tightening of the connector on the cable.

In particular embodiments, the first connector portion comprises a back nut assembly.

In particular embodiments, the second connector portion comprises a center body.

In particular embodiments, the support portion comprises a support sleeve.

In particular embodiments, the cable gripping portion comprises a cable gripping ferrule.

In particular embodiments, the first connector portion is structurally configured to include the indicator portion on an outer surface of the first connector portion.

In particular embodiments, the indicator portion comprises a plurality of indicator portions.

In particular embodiments, the cable connector further comprises a third connector portion that is structurally configured to be coupled with the first end of the second connector portion.

In particular embodiments, the first connector portion is structurally configured to include an engaging portion, the second connector portion is structurally configured to include an engaging portion, and the engaging portion of the first connector portion is structurally configured to be engaged with the engaging portion of the second connector portion such that rotation of the first connector portion relative to the second connector portion moves the first portion axially relative to the second connector portion.

In particular embodiments, the first connector portion includes a first surface that is structurally configured to contact the support portion, the first surface of the first connector portion is structurally configured to move the support portion axially into the second connector portion in response to the axial movement of the first connector portion relative to the second connector portion.

In particular embodiments, the cable gripping portion is structurally configured to include an angled portion, the support portion is structurally configured to include an angled portion that is structurally configured to contact the angled portion of the cable gripping portion, and the angled portion of the support portion is structurally configured to move relative to the angled portion of the cable gripping portion is response to axial movement of the support portion such that the cable gripping portion is moved radially inward.

In particular embodiments, the indicator portion comprises a first indicator portion, the cable connector comprises a second indicator portion, the first indicator portion is structurally configured to correspond to a first predetermined position of the first connector portion relative to the second connector portion that corresponds to a preferred installed position for a first particular outer diameter of a cable on which the connector is installed, and the second indicator portion is structurally configured to correspond to a second predetermined position of the first connector portion relative to the second connector portion that corresponds to a preferred installed position for a second particular outer diameter of a cable on which the connector is installed.

In particular embodiments, the first and second indicator portions are structurally configured to facilitate the connector being installed on the cable with a preferred force for a given outer diameter of the cable.

Embodiments include a cable connector having: a support portion that is structurally configured to move relative to a cable gripping portion when a first connector portion moves relative to a second connector portion; and an indicator portion that is structurally configured to indicate an amount of radial compression of a cable gripping portion when the second connector portion moves in an axial direction. The indicator portion is structurally configured to provide a visual stop indicator reference point when the second connector portion moves in the axial direction and when the first connector portion is coupled with the second connector portion such that the cable gripping portion grips the cable with a predetermined amount of radial force based on an outer diameter portion of the cable so as to allow an installer to use the visual stop indicator reference point to prevent under-tightening and/or over-tightening of the connector on the cable.

In particular embodiments, the cable connector further comprises the support portion, and the support portion is structurally configured to be positioned in the second connector portion.

In particular embodiments, the first connector portion is structurally configured to move the support portion axially relative to the second connector portion in response to the movement of the first connector portion relative to the second connector portion.

In particular embodiments, the cable connector further comprises the cable gripping portion, and the support portion is structurally configured to move axially relative to the cable gripping portion when the first connector portion moves relative to the second connector portion.

In particular embodiments, the cable connector further comprises the cable gripping portion, and the cable gripping portion is structurally configured to be positioned partially in the support portion.

In particular embodiments, the first connector portion is structurally configured to engage with the second connector portion such that rotation of the first connector portion relative to the second connector portion moves the first connector portion axially relative to the second connector portion.

In particular embodiments, the indicator portion comprises a first indicator portion, the cable connector comprises a second indicator portion, the first indicator portion is structurally configured to correspond to a first predetermined position of the first connector portion relative to the second connector portion that indicates a preferred installed position for a first particular outer diameter of a cable on which the connector is to be installed, and the second indicator portion is structurally configured to correspond to a second predetermined position of the first connector portion relative to the second connector portion that indicates a preferred installed position for a second particular outer diameter of a cable on which the connector is to be installed.

Although embodiments of the disclosure are described with reference to a hardline connector, the features of the disclosure are also applicable to flexible coaxial cable connectors.

Various aspects of the hardline coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments provide a cable connector having an indicator portion that is structurally configured to provide a visual stop indicator reference point when a second connector portion moves in an axial direction and when a first connector portion is coupled with the second connector portion such that a cable gripping portion grips a cable with a predetermined amount of radial force based on an outer diameter portion of the cable so as to allow an installer to use the visual stop indicator reference point to prevent under-tightening and/or over-tightening of the connector on the cable.

Embodiments of the disclosure provide the back nut of a hardline connector with markings that provide visual stop points corresponding to different amounts of compression to be applied to a cable being terminated by the connector such that a technician can apply a desired amount of compression based on the size of the cable. Although examples shown include a three piece body (front nut assembly, center body, back nut assembly), other embodiments include a two piece body such as, for example, a main body and a back nut assembly.

Figure 1:
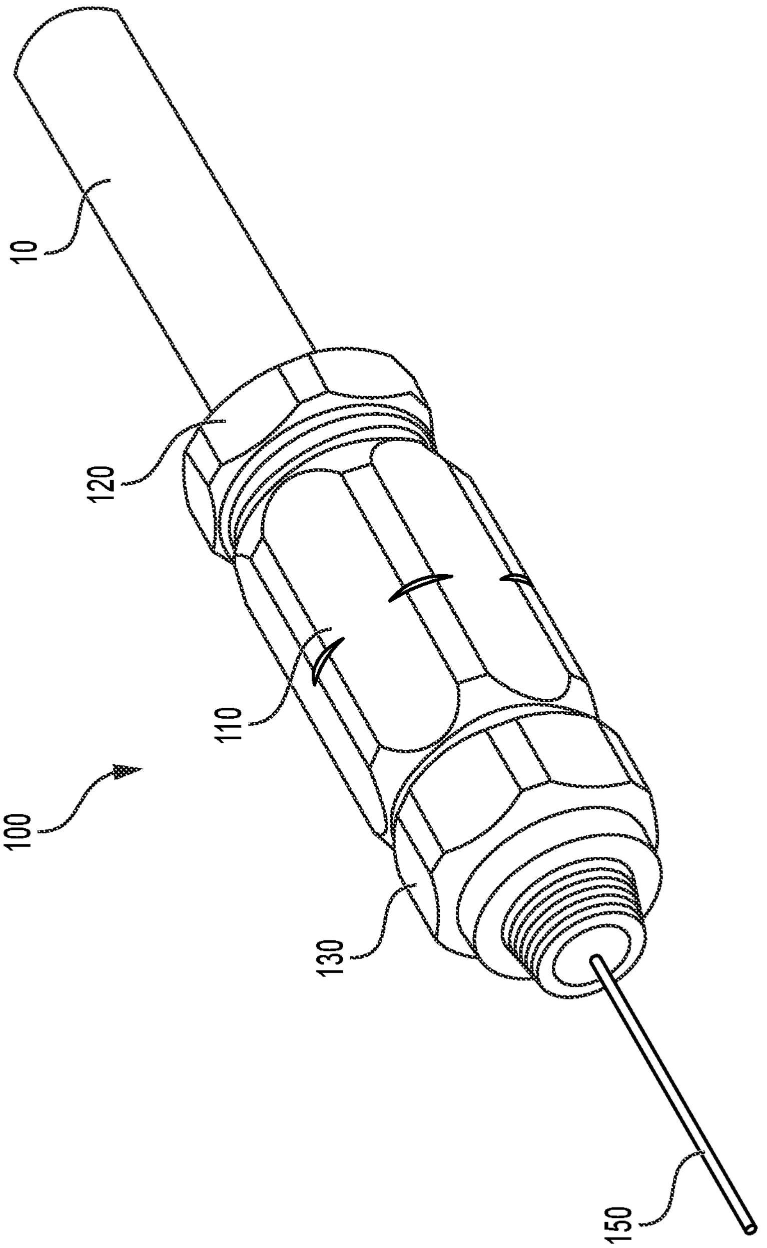
FIG. 1 is a perspective view of an exemplary hardline connector in accordance with various aspects of the disclosure installed on a coaxial cable.
Figure 2:
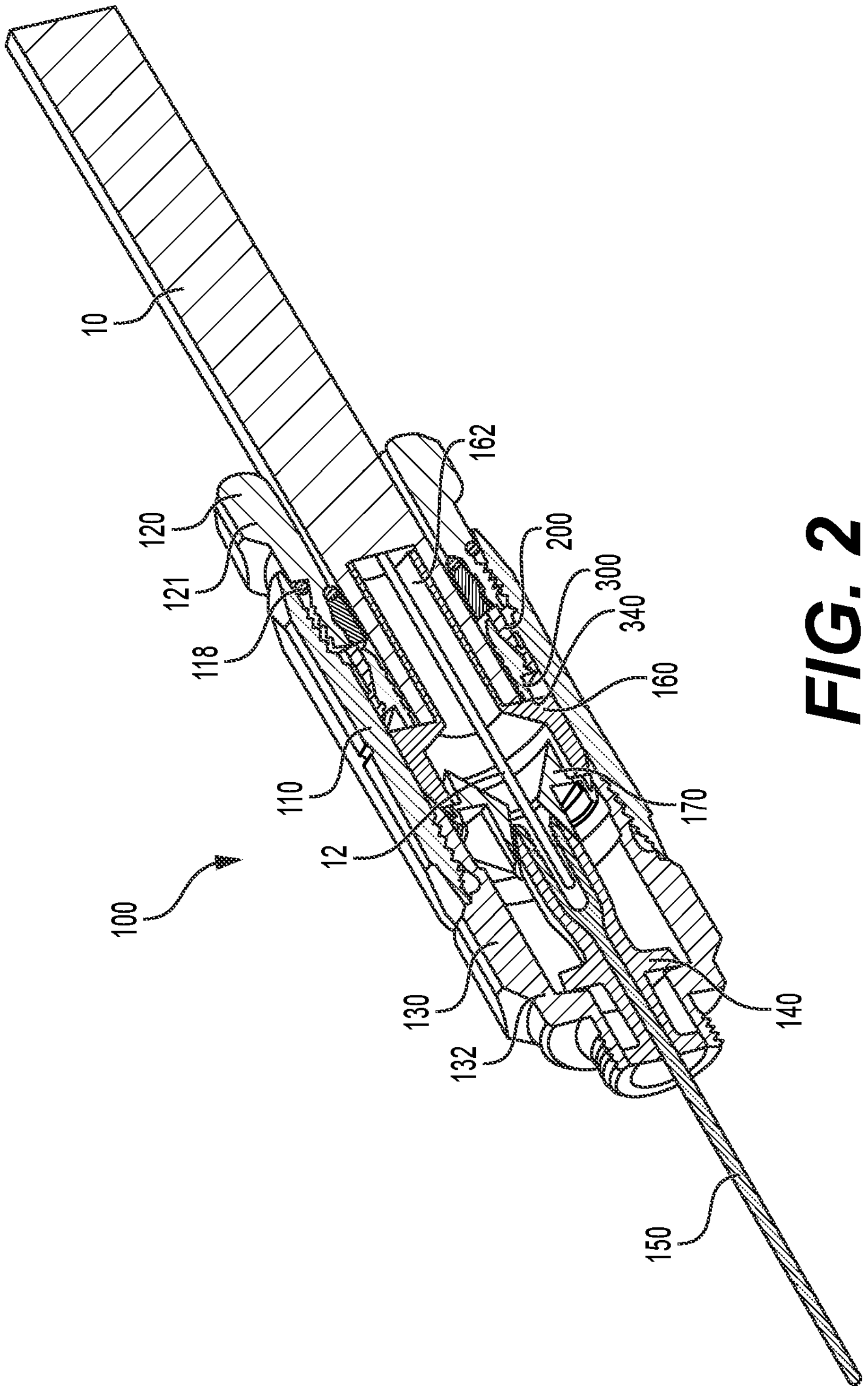
FIG. 2 is a sectional perspective view of the connector of FIG. 1 installed on a coaxial cable.

Referring FIGS. 1 and 2, a connector 100 is depicted. The connector 100 is configured for hardline or semi-rigid coaxial cables. The connector 100 includes a third portion, for example, a front nut assembly, 130 and a first connector portion, for example, a back nut assembly, 120 that are configured to be removably connected to a second connector portion, for example, a center body, 110 while providing a mechanical connection therebetween.

A coaxial cable 10, for example, a hardline coaxial cable, is inserted into the rearward end of the back nut assembly 120 of the connector 100. Coaxial cables generally include a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as, for example, a polyethylene, a fluorinated plastic material, such as, for example, a polyethylene or a polytetrafluoroethylene, a fiberglass braid, or the like. The cable shield or outer conductor is typically made of metal, such as aluminum or copper, and is often extruded to form a hollow tubular structure with a solid wall having a smooth exterior surface. An insulative cable jacket may surround the cable outer conductor to further seal the coaxial cable. The cable jacket is typically made of plastic, such as polyvinylchloride, polyethylene, polyurethane, or polytetrafluoroethylene.

The connector 100 includes a plurality of components generally having a coaxial configuration about an axis defined by a center conductor 12 of the coaxial cable 10. The front nut assembly 130 includes third portion main portion, for example, a front body housing, 132 supporting an extending conductor portion, for example, a pin assembly, 150 therein. Specifically, the front body housing 132 is formed with an axial bore configured to cooperatively contain the pin assembly 150 and is made from an electrically conductive material such as aluminum, brass, or the like. The front body housing 132 is formed with an external threaded portion at its forward end and a rearward external threaded portion opposite the forward threaded portion. The forward threaded portion is configured to cooperate with devices located in the field that receive the forward end of the pin assembly 150. A seal, for example, an O-ring, may be provided around the forward threaded portion to improve the seal that is made with a device. A portion of the exterior perimeter of the front body housing 132 may be provided with a tool receiving portion, for example, a hexagonal shape, to accommodate the use of tools during installation. An insulative (i.e., non-conductive) portion, for example, an insulative body, 140 maintains the position of the pin assembly 150 in the front body housing 132. A seizure portion, for example, a seizure bushing, 170 is urged forward into the front nut housing 132 by a conductor portion, for example, a mandrel, 160 during assembly and compresses a gripping portion in the pin assembly 150 around the center conductor 12 of the coaxial cable 10.

The rearward threaded portion of the front nut assembly 130 is configured to cooperate with the body. Specifically, the rearward threaded portion includes a rim face that cooperates with the mandrel 160. A seal, for example, an O-ring, may be provided around the rearward threaded portion to improve the seal that is made with the center body 110.

The center body 110 of the connector 100 includes a compression subassembly rotatably supported within the axial bore. The compression subassembly generally includes the mandrel 160, a support portion, for example, a support sleeve, 200, and a cable gripping portion, for example, a cable gripping ferrule, 300 arranged in a coaxial relationship about the central axis of the center body 110.

A first connector portion main portion, for example, a back body housing, 121 of the back nut assembly 120 is made from an electrically conductive material, such as, for example, aluminum, brass, or the like, and includes an engaging portion, for example, a forward threaded portion, configured to cooperate with an engaging portion, for example, a rearward threaded portion, of the center body 110 so that the back body housing 121 and the center body 110 may be threadedly coupled together. The exterior surface of the back body housing 121 is preferably provided with a tool receiving portion, for example, a hexagonal shape, to accommodate the use of tools to facilitate such threaded coupling.

Figure 3:
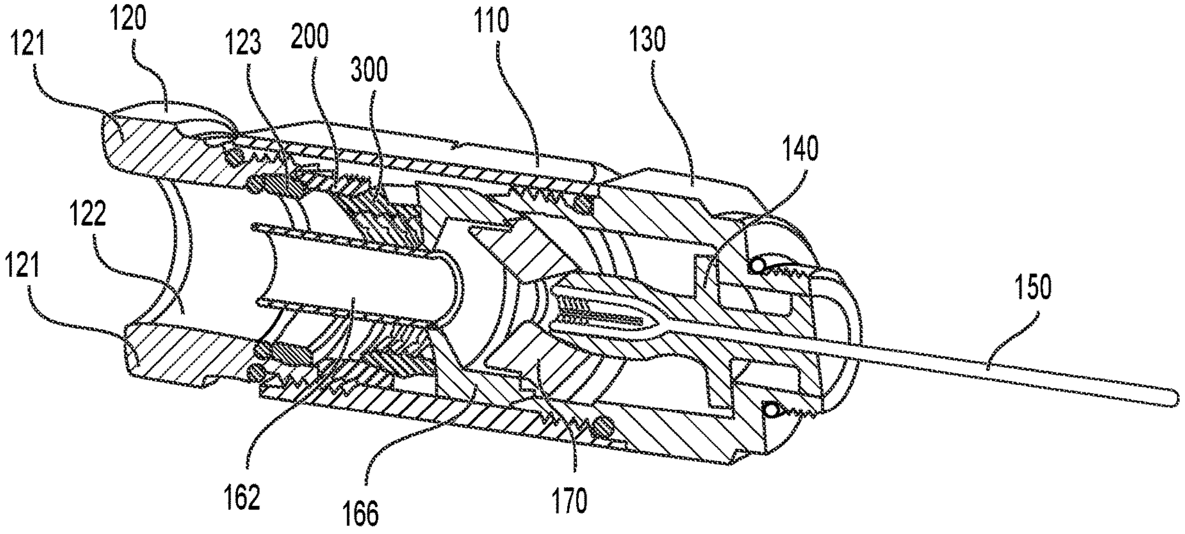
FIG. 3 is a sectional perspective view of the connector of FIG. 1.

FIG. 3 shows the connector 100 before it is installed on the coaxial cable 10. The back body housing 121 has a cable receiving area, for example, a central bore, 122 that receives the coaxial cable 10. As shown in FIGS. 2 and 3, the mandrel 160 has a conductor portion extension portion, for example, a tubular extension, 162 that extends into the coaxial cable 10 when the connector 100 is installed on the coaxial cable 10. The tubular extension 162 makes an electrical connection with the cable outer conductor of the coaxial cable 10 and is electrically connected to the front body housing 132.

Figure 4:
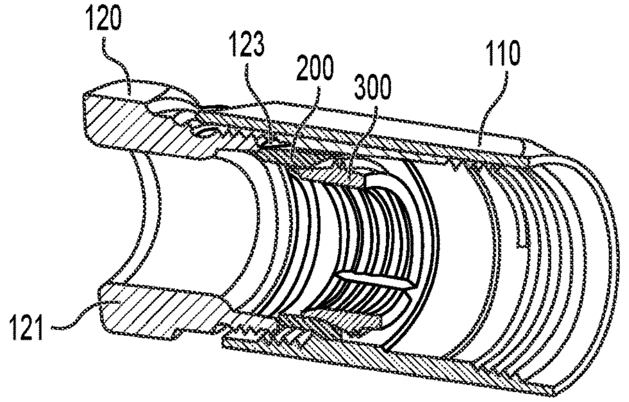
FIG. 4 is a partial sectional perspective view of the connector of FIG. 1 with several parts removed for clarity.
Figure 5:
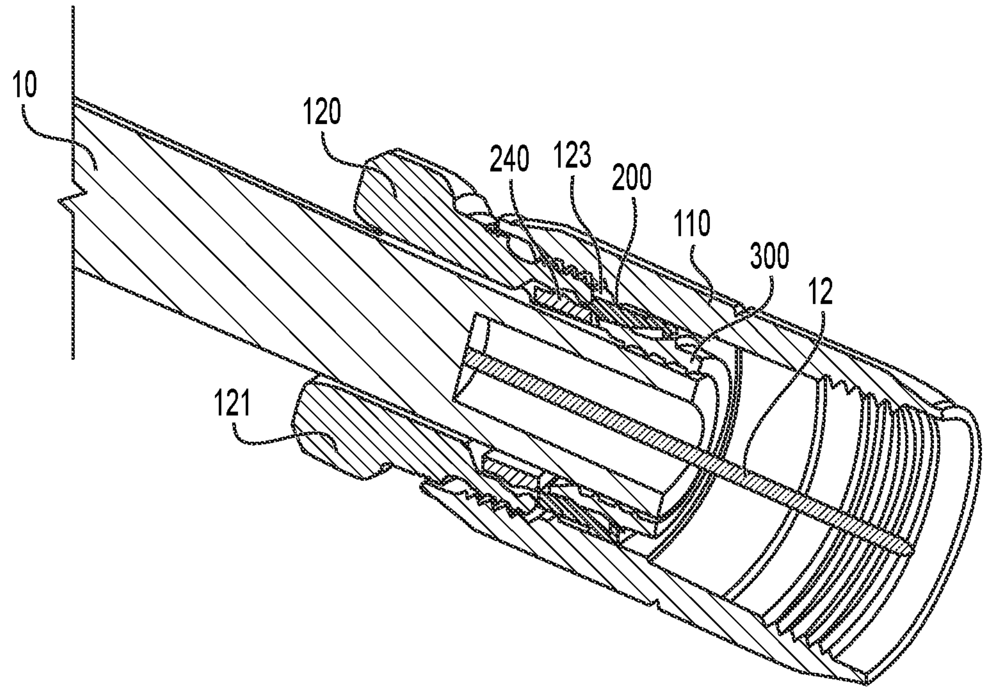
FIG. 5 is a partial sectional perspective view of the connector of FIG. 1 with several parts removed for clarity and showing the coaxial cable in place.

FIG. 4 shows the connector 100 with several internal parts removed for clarity and shows the connector 100 is a pre-installed position before the connector 100 is installed on the coaxial cable 10. FIG. 5 shows the parts of the connector 100 shown in FIG. 4 in an installed position on the coaxial cable 10. As shown in FIGS. 4 and 5, a first connector portion surface, for example, a front surface, 123 of the back body housing 121 contacts a support portion surface, for example, a rear surface, 240 of the support sleeve 200. Rotating the back body housing 121 relative to the center body 110 causes the back body housing 121 to move farther into the center body 110 due to the threaded connection between the back body housing 121 and the center body 110. Forward movement of the back body housing 121 (to the right in FIGS. 4 and 5) into the center body 110 causes the front surface 123 of the back body housing 121 to press against the rear surface 240 of the support sleeve 200 and move the support sleeve 200 farther into the center body 110. The forward movement of the support sleeve 200 causes the support sleeve 200 to move axially relative to the cable gripping ferrule 300. As shown in FIG. 2, a cable gripping portion surface, for example, a front surface, 340 of the cable gripping ferrule 300 contacts a conductor portion surface, for example, a rear surface, of the mandrel 160 to limit the forward movement of the cable gripping ferrule 300.

Figure 10:
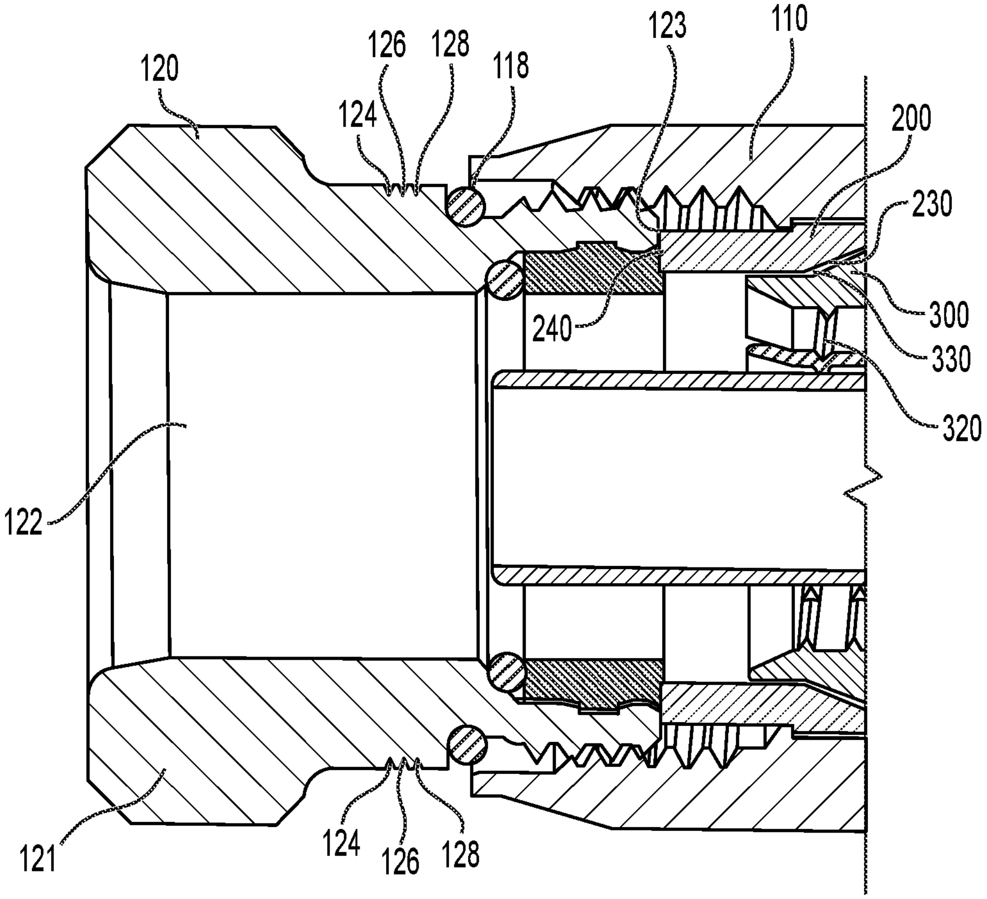
FIG. 10 is a partial sectional view of the connector of FIG. 1.

As the support sleeve 200 moves axially forward relative to the cable gripping ferrule, an angled surface, for example, a ramp, 230 of the support sleeve 200 presses both axially and radially on an angled surface, for example, a ramp, 330 of the cable gripping ferrule 300 (see FIG. 10). Comparing FIG. 5 to FIG. 4 shows the back body housing 121 being located farther in the center body 110 after the connector is installed on the coaxial cable 10. A comparison of FIG. 5 to FIG. 4 also shows the support sleeve 200 overlapping the cable gripping ferrule 300 more when the connector is installed on the coaxial cable 10. The inward radially force exerted on the cable gripping ferrule 300 by the support sleeve 200 causes the cable gripping ferrule 300 to be clamped onto the coaxial cable 10.

Figure 6:
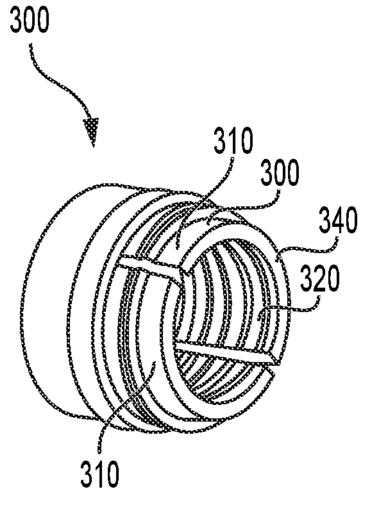
FIG. 6 is a perspective view of an exemplary cable gripping ferrule and holder sleeve of the connector of FIG. 1.

FIG. 6 shows the support sleeve 200 positioned around the cable gripping ferrule 300. The cable gripping ferrule 300, in this example, has two body parts 310, each of which has an internal gripping surface 320. Also shown in FIG. 6 is the front surface 340 of the cable gripping ferrule 300. While FIG. 6 shows the cable gripping ferrule having two body parts 310, other embodiments have a one-piece cable gripping ferrule with an axial gap that permits compression in response to the radial force exerted on the cable gripping ferrule by the support sleeve 200.

Figure 7:
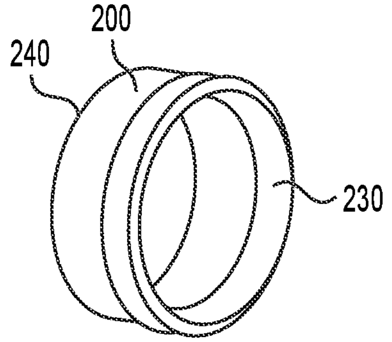
FIG. 7 is a perspective view of holder sleeve of FIG. 6.
Figure 8:
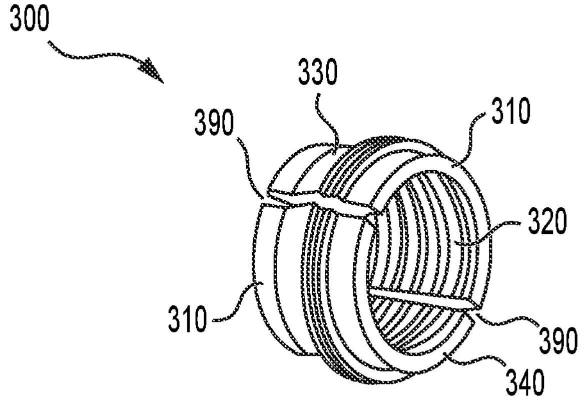
FIG. 8 is a perspective view of the cable gripping ferrule of FIG. 6.

FIG. 7 shows an example of the support sleeve 200 and the ramp 230 and the rear surface 240 of the support sleeve 200. FIG. 8 shows an example of the cable gripping ferrule 300 and shows the two body parts 310, the internal gripping surfaces 320, the ramps 330, and the front surface 340 of the cable gripping ferrule 300.

As described above, movement of the back body housing 121 into the center body 110 causes the cable gripping ferrule to clamp down on the coaxial cable 10. The farther the back body housing 121 moves into the center body 110, the more radially inward force is exerted on the coaxial cable 10 by the cable gripping ferrule 300. Gaps 390 (shown in FIG. 8) between the two body parts 310 of the cable gripping ferrule 300 allow the two body parts 310 to move radially inward under the radially inward force exerted on the two body parts 310 by the support sleeve 200. The radially inward movement of the two body parts 310 causes an inner diameter of the two body parts 310 to change depending on the amount of force applied to the two body parts 310 by the support sleeve 200. As a result of this variable inner diameter, the connector 100 can be securely installed on coaxial cables of different outer diameters.

Because coaxial cables having different outer diameters require a different relative position of the support sleeve 200 to the cable gripping ferrule 300 for proper installation, it is beneficial to know the position of the back body housing 121 relative to the center body 110 that corresponds to the proper relative position of the support sleeve 200 to the cable gripping ferrule 300. With conventional connectors, a technician rotates the back body housing "by feel" into the center body to a point where the technician believes that the proper clamping force is being exerted on the coaxial cable, which can lead to improper installation. Embodiments of the invention address this problem by providing visual indicators on the back body housing 121 that indicate to the technician the proper relative position of the back body housing 121 to the center body 110.

Figure 9:
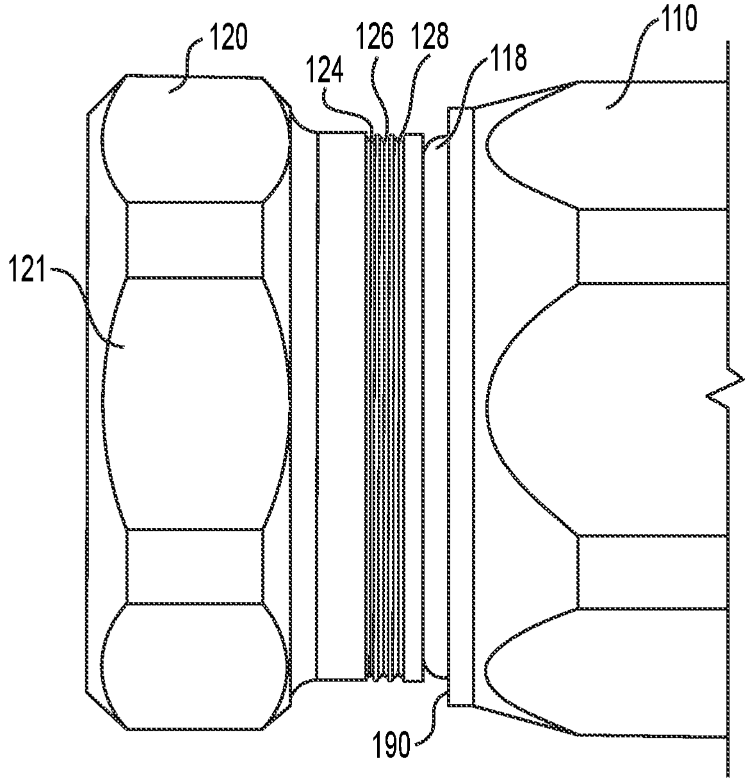
FIG. 9 is a partial side view of the connector of FIG. 1.

FIG. 9 shows three indicator portions, for example, grooves, 124, 126, 128 in the back body housing 121. FIG. 9 shows connector 100 in the position shown in FIG. 4, which is before the connector 100 is installed on the coaxial cable 10. In this position all of the grooves 124, 126, 128 are visible from outside of the connector 100. As the back body housing 121 is rotated into the center body 110, one or more of the grooves 124, 126, 128 move inside the center body 110 and disappear from view. The various parts of the connector 100 are configured and sized to result in each of the grooves 124, 126, 128 corresponding to a particular outer diameter of the coaxial cable 10. For example, the groove 128 corresponds to a coaxial cable having a large outer diameter, the groove 126 corresponds to a coaxial cable having an intermediate outer diameter, and the groove 124 corresponds to a coaxial cable having a small outer diameter. By rotating the back body housing to the point where the groove 126 aligns with a second portion indicator surface, for example, a rear surface, 190 of the center body 110, the technician knows that the proper amount of force is applied for a coaxial cable having the intermediate outer diameter. Similarly, by rotating the back body housing to the point where the groove 124 aligns with a rear surface 190 of the center body 110, the technician knows that the proper amount of force is applied for a coaxial cable having the small outer diameter. Also, by rotating the back body housing to the point where the groove 128 aligns with a rear surface 190 of the center body 110, the technician knows that the proper amount of force is applied for a coaxial cable having the large outer diameter. While the example shown has three grooves 124, 126, 128 in back body housing 121, other embodiments include fewer or more grooves, or other indicator portions, in the back body housing 121. FIG. 9 also shows a seal, for example, an O-ring, 118 between the back body housing 121 and the center body 110 to provide a water-proof seal between the back body housing 121 and the center body 110.

FIG. 10 shows the connector 100 in an un-installed position before the coaxial cable 10 is inserted into central bore 122 of the back body housing 121 and before the back body housing 121 is rotated into the center body 110. FIG. 10 shows the interaction between the ramp 230 of the support sleeve 200 and the ramp 330 of the cable gripping ferrule 300.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A cable connector comprising:

a first connector portion having a cable receiving end and a forward end opposite the cable receiving end;

a second connector portion having a front end, and a back end that is structurally configured to be coupled with the forward end of the first connector portion;

a third connector portion that is structurally configured to be coupled with the front end of the second connector portion;

a support portion that is structurally configured to be positioned in the second connector portion;

a cable gripping portion that is structurally configured to be positioned partially in the support portion;

a plurality of indicator portions;

wherein the cable gripping portion is structurally configured to include an angled portion;

wherein the support portion is structurally configured to include an angled portion that is structurally configured to contact the angled portion of the cable gripping portion;

wherein the angled portion of the support portion is structurally configured to move axially relative to the angled portion of the cable gripping portion when the first connector portion moves relative to the second connector portion;

wherein the first connector portion is structurally configured to include an engaging portion;

wherein the second connector portion is structurally configured to include an engaging portion;

wherein the engaging portion of the first connector portion is structurally configured to engage with the engaging portion of the second connector portion such that rotation of the first connector portion relative to the second connector portion moves the first connector portion axially relative to the second connector portion;

wherein the first connector portion includes a first surface that is structurally configured to contact the support portion;

wherein the first surface of the first connector portion is structurally configured to move the support portion axially into the second connector portion in response to the axial movement of the first connector portion relative to the second connector portion;

wherein the angled portion of the support portion is structurally configured to move relative to the angled portion of the cable gripping portion is response to axial movement of the support portion such that the cable gripping portion is moved radially inward;

wherein each of the plurality of indicator portions is structurally configured to correspond to a predetermined position of the first connector portion relative to the second connector portion;

wherein each of the predetermined positions of the first connector portion relative to the second connector portion corresponds to a preferred assembled position for a particular outer diameter of a cable on which the connector is to be installed;

wherein the indicator portions correspond to different amounts of radial compression of the cable gripping portion in response to axial movement of the support portion; and wherein the indicator portions are structurally configured to provide visual stop indicator reference points when the second connector portion moves in an axial direction and when the first connector portion is coupled with the second connector portion such that the cable gripping portion grips the cable with a predetermined amount of radial force based on an outer diameter portion of the cable so as to allow an installer to use the visual stop indicator reference point to prevent under-tightening and/or over-tightening of the connector on the cable.

2. The cable connector of claim 1, wherein the first connector portion comprises a back nut assembly.

3. The cable connector of claim 1, wherein the second connector portion comprises a center body.

4. The cable connector of claim 1, wherein the third connector portion comprises a front nut assembly.

5. The cable connector of claim 1, wherein the support portion comprises a support sleeve.

6. The cable connector of claim 1, wherein the cable gripping portion comprises a cable gripping ferrule.

7. The cable connector of claim 1, wherein the angled portion of the cable gripping portion comprises a ramp.

8. The cable connector of claim 7, wherein the angled portion of the support portion comprises a ramp.

9. The cable connector of claim 1, wherein each of the indicator portions is structurally configured as a groove.

10. The cable connector of claim 1, wherein the first connector portion is structurally configured to include the plurality of indicator portions on an outer surface of the first connector portion.

11. The cable connector of claim 1, wherein the engaging portion of the first connector portion comprises a threaded portion.

12. The cable connector of claim 11, wherein the engaging portion of the second connector portion comprises a threaded portion.

13. A device for providing enhanced coaxial cable connector installation and/or tightening during operation comprising:

an enhanced installation coaxial cable connector assembly comprising:

a first connector portion having a cable receiving end and a second end opposite the cable receiving end;

a second connector portion having a first end, and a second end that is structurally arranged to be coupled with the second end of the first connector portion;

a support portion that is structurally arranged to be positioned in the second connector portion;

a cable gripping portion that is structurally arranged to be positioned partially in the support portion;

wherein the second connector portion includes an indicator portion;

wherein the support portion is structurally arranged to move axially relative to the cable gripping portion when the first connector portion moves relative to the second connector portion;

wherein the first connector portion is structurally arranged to engage with the second connector portion such that rotation of the first connector portion relative to the second connector portion moves the first connector portion axially relative to the second connector portion;

wherein the first connector portion is structurally arranged to move the support portion axially relative to the second connector portion in response to the axial movement of the first connector portion relative to the second connector portion;

wherein the indicator portion corresponds to an amount of radial compression of the cable gripping portion in response to axial movement of the support portion;

wherein the indicator portion comprises a first indicator portion and a second indicator portion;

wherein the first indicator portion is structurally arranged to correspond to a first predetermined position of the first connector portion relative to the second connector portion that corresponds to a preferred installed position for a first particular outer diameter of a cable on which the device is installed, and the second indicator portion is structurally arranged to correspond to a second predetermined position of the first connector portion relative to the second connector portion that corresponds to a preferred installed position for a second particular outer diameter of a cable on which the device is installed; and wherein the enhanced installation coaxial cable connector assembly is structurally arranged to provide enhanced installation and/or prevent under-tightening and/or over-tightening during operation by providing a visual stop indicator reference point to a user so as to allow the user to move the second connector portion in an axial direction relative to the first connector portion during operation such that the cable gripping portion grips the cable with a predetermined amount of radial force based on an outer diameter portion of the cable.

14. The device of claim 13, wherein the first connector portion comprises a back nut assembly.

15. The device of claim 13, wherein the second connector portion comprises a center body.

16. The device of claim 13, wherein the support portion comprises a support sleeve.

17. The device of claim 13, wherein the cable gripping portion comprises a cable gripping ferrule.

18. The device of claim 13, wherein the first connector portion is structurally arranged to include the indicator portion on an outer surface of the first connector portion.

19. The device of claim 13, wherein the indicator portion comprises a plurality of indicator portions.

20. The device of claim 13, wherein the cable connector further comprises a third connector portion that is structurally arranged to be coupled with the first end of the second connector portion.

21. The device of claim 13, wherein the first connector portion is structurally arranged to include an engaging portion, the second connector portion is structurally arranged to include an engaging portion, and the engaging portion of the first connector portion is structurally arranged to be engaged with the engaging portion of the second connector portion such that rotation of the first connector portion relative to the second connector portion moves the first connector portion axially relative to the second connector portion.

22. The device of claim 13, wherein the first connector portion includes a first surface that is structurally arranged to contact the support portion, the first surface of the first connector portion is structurally arranged to move the support portion axially into the second connector portion in response to the axial movement of the first connector portion relative to the second connector portion.

23. The device of claim 13, wherein the cable gripping portion is structurally arranged to include an angled portion, the support portion is structurally arranged to include an angled portion that is structurally arranged to contact the angled portion of the cable gripping portion, and the angled portion of the support portion is structurally arranged to move relative to the angled portion of the cable gripping portion is response to axial movement of the support portion such that the cable gripping portion is moved radially inward.

24. The device of claim 13, wherein the first and second indicator portions are structurally arranged to facilitate the device being installed on the cable with a preferred force for a given outer diameter of the cable.

25. A device for providing enhanced coaxial cable connector installation and/or tightening during operation comprising:

an enhanced installation coaxial cable connector assembly comprising:

a support portion that is structurally arranged to move relative to a cable gripping portion when a first connector portion moves relative to a second connector portion;

an indicator portion that is structurally arranged to indicate an amount of radial compression of a cable gripping portion when the second connector portion moves in an axial direction;

wherein the indicator portion comprises a first indicator portion and a second indicator portion;

wherein the first indicator portion is structurally arranged to correspond to a first predetermined position of the first connector portion relative to the second connector portion that indicates a preferred installed position for a first particular outer diameter of a cable on which the device is to be installed, and the second indicator portion is structurally arranged to correspond to a second predetermined position of the first connector portion relative to the second connector portion that indicates a preferred installed position for a second particular outer diameter of a cable on which the device is to be installed; and wherein the enhanced installation coaxial cable connector assembly is structurally arranged to provide enhanced installation and/or prevent under-tightening and/or over-tightening during operation by providing a visual stop indicator reference point to a user so as to allow the user to move the second connector portion in an axial direction relative to the first connector portion during operation such that the cable gripping portion grips the cable with a predetermined amount of radial force based on an outer diameter portion of the cable.

26. The device of claim 25, wherein the device further comprises the support portion, and the support portion is structurally arranged to be positioned in the second connector portion.

27. The device of claim 26, wherein the first connector portion is structurally arranged to move the support portion axially relative to the second connector portion in response to the movement of the first connector portion relative to the second connector portion.

28. The device of claim 26, wherein the device further comprises the cable gripping portion, and the support portion is structurally arranged to move axially relative to the cable gripping portion when the first connector portion moves relative to the second connector portion.

29. The device of claim 25, wherein the device further comprises the cable gripping portion, and the cable gripping portion is structurally arranged to be positioned partially in the support portion.

30. The device of claim 25, wherein the first connector portion is structurally arranged to engage with the second connector portion such that rotation of the first connector portion relative to the second connector portion moves the first connector portion axially relative to the second connector portion.

* * * * *